(No Model.)
W. A. HUNTER.
HARNESS.
No. 476,797. Patented June 14, 1892.
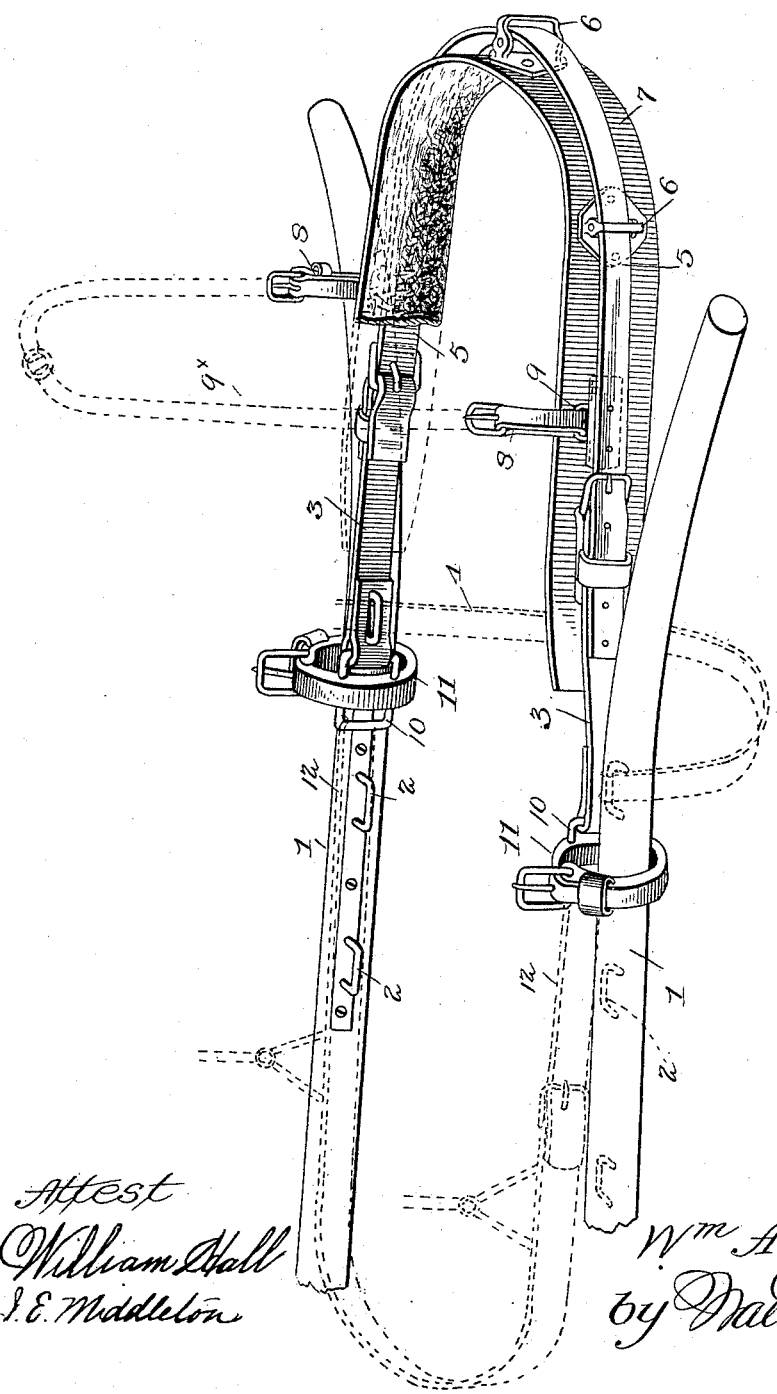

UNITED STATES PATENT OFFICE.

WILLIAM A. HUNTER, OF TERRE HAUTE, INDIANA, ASSIGNOR TO DELLA R. HUNTER, OF SAME PLACE.

HARNESS.

SPECIFICATION forming part of Letters Patent No. 476,797, dated June 14, 1892.

Application filed February 27, 1892. Serial No. 423,060. (No model.)

*To all whom it may concern:*

Be it known that I, WILLIAM A. HUNTER, a citizen of the United States of America, residing at Terre Haute, in the county of Vigo and State of Indiana, have invented certain new and useful Improvements in Harness, of which the following is a specification, reference being had therein to the accompanying drawing.

It is the object of my invention to provide a "single-hitch harness" in which the various parts are so connected together that they may be connected to the thills by a single fastening. The ordinary traces and singletree will be dispensed with. Ordinarily in many forms of harnesses the parts are fastened separately to the thill, the traces, for instance, being connected to the thills through the singletree, while the holdback is connected midway of the thills separately, as are also the loops for supporting the thills. While aiming to provide such a harness as will facilitate the use of the same, I desire to afford the greatest amount of comfort possible to the animal harnessed.

In the accompanying drawing the figure is a perspective view of the harness attached to the thills.

The thills 1 are of ordinary construction, and have a series of loops or staples 2 along their inner sides. The draft-tug sections 3 are perforated to receive these staples, which project through them and receive in turn the shaft-strap 4. The front end of the tugs are provided with buckles to connect with the breast-strap 5, which passes around the front of the animal through loop 6, secured to a breast-collar 7, a loop being provided directly in front and on each side. The breast-strap bears upon rollers journaled in these loops; and it will be seen from this arrangement that the same motion of the animal is provided for as in the use of a singletree. The breast-collar is supported by means of a strap or straps passing over the animal and secured adjustably by means of a buckle on the connections 8, pivotally secured to the breast-strap by the rings 9 and the clips. The upper ends of the straps 9× are connected by a ring, which may be used to connect with the water-hook. The draft-tug sections 3 project slightly in rear of the openings formed therein for receiving the staples on the thills, and these projecting ends hold the metallic staples 10, which pass through the thill-tugs 11 and project beyond them, so as to afford a connection for the draft-tug sections 12, which may be of any ordinary form. The thill-tugs 11 have the usual buckles to connect with the strap of the saddle.

From this construction it will be seen that the rear ends of the draft-tug sections 3 carry thill-tugs and also the sections 12, and have means whereby they may be readily attached to or detached from the thills, and the whole operation of hitching or unhitching the harness to the thills is effected by simply placing the tugs 3 over the loops and securing them by running the shaft-straps through the projecting ends of the staples. The harness may be adjusted forward or back in the thills by simply removing the draft-tug sections from one pair of staples and connecting them with another pair.

The breast-collar is suitably lined on the inside with soft material and may be ornamented on its outer side in any desired way.

I claim as my invention—

1. In combination, the draft-tug sections 3, perforated at their rear ends, the loops on the thills adapted to the said perforations, the said draft-tug sections having in their rearwardly-projecting ends metallic staples, the thill-tugs secured to said staples, the draft-tug sections 12, also secured to said loops, and the shaft-straps adapted to pass through the thill-loops for holding the tugs in place, substantially as described.

2. In combination, the draft-tug sections 3, having perforations, the thills having a series of loops to enter said perforations, the thill-tugs connected to the draft-tugs 3, the draft-tug sections 12, also connected with the sections 3, and the means for holding the sections 3 to the thills, substantially as described.

3. In combination, the breast-collar, the breast-straps supported thereby to have longitudinal movement, the draft-tug sections 3 at the rear ends of the breast-strap, the thill-tugs connected to the draft-tug sections 3 and carried thereby, the draft-tug sections 12, also connnected to the tug-sections 3, and means for securing the sections 3 to the thills, substantially as described.

In testimony whereof I affix my signature in presence of two witnesses.

WM. A. HUNTER.

Witnesses:
 JAMES E. PIETY,
 CHARLES C. WHITE.